United States Patent
Pérez et al.

(10) Patent No.: US 10,364,540 B2
(45) Date of Patent: Jul. 30, 2019

(54) SYSTEM FOR INDUCTIVE POWER TRANSFER, PAVEMENT SLAB ASSEMBLY AND METHOD OF OPERATING A SYSTEM FOR INDUCTIVE POWER TRANSFER

(71) Applicant: Bombardier Primove GmbH, Berlin (DE)

(72) Inventors: Sergio Pérez, Alsbach-Hahnlein (DE); Éanna Curran, Darmstadt (DE); Oliver Vietzke, Berlin (DE)

(73) Assignee: Bombardier Primove GmbH, Berlin (DE)

( * ) Notice: Subject to any disclaimer, the term of this patent is extended or adjusted under 35 U.S.C. 154(b) by 408 days.

(21) Appl. No.: 15/303,103

(22) PCT Filed: Mar. 30, 2015

(86) PCT No.: PCT/EP2015/056835
§ 371 (c)(1),
(2) Date: Oct. 10, 2016

(87) PCT Pub. No.: WO2015/158534
PCT Pub. Date: Oct. 22, 2015

(65) Prior Publication Data
US 2017/0030039 A1    Feb. 2, 2017

(30) Foreign Application Priority Data

Apr. 14, 2014    (GB) .................................. 1406659.1

(51) Int. Cl.
*B60L 53/12*    (2019.01)
*E01H 5/10*    (2006.01)
(Continued)

(52) U.S. Cl.
CPC .............. *E01H 5/102* (2013.01); *B60L 53/12* (2019.02); *B60M 7/003* (2013.01); *E01C 9/00* (2013.01);
(Continued)

(58) Field of Classification Search
CPC ..... B60L 11/182; Y02T 90/122; B60M 7/003; E01C 9/00; H05B 3/18; H05B 2203/021; E01H 5/102
See application file for complete search history.

(56) References Cited

U.S. PATENT DOCUMENTS 2,876,326 A * 3/1959 Akmentin ............. E01C 11/265
219/213
3,568,924 A * 3/1971 Chenault ................. E01C 11/26
237/1 R (Continued)

FOREIGN PATENT DOCUMENTS

CN    101280554 A    10/2008
CN    101736715 A    6/2010
(Continued)

OTHER PUBLICATIONS

"Airside Use of Heated Pavement Systems," Advisory Circular No. 150/5370-17, Mar. 29, 2011, pp. 1-40, U.S. Department of Transportation, Federal Aviation Administration.
(Continued)

*Primary Examiner* — Zachary L Kuhfuss
(74) *Attorney, Agent, or Firm* — The Webb Law Firm

(57) ABSTRACT

The invention relates to a system for inductive power transfer to vehicles driving or standing on a surface of a route, in particular to road automobiles, wherein the system includes a primary winding structure for generating an alternating electromagnetic field, wherein a field volume (FV) is assigned to the primary winding structure, wherein
(Continued)

the system includes at least a part of a first heating system, wherein elements of the first heating system which are arranged within the field volume (FV) are non-metallic elements. Further, the invention relates to a pavement slab assembly and a method of operating a system for inductive power transfer.

19 Claims, 3 Drawing Sheets

(51) Int. Cl.
    *B60M 7/00*       (2006.01)
    *E01C 9/00*        (2006.01)
    *F24H 1/00*        (2006.01)
    *H02J 7/02*         (2016.01)
    *H05B 3/18*        (2006.01)
    *H05B 3/34*        (2006.01)

(52) U.S. Cl.
    CPC ............ *F24H 1/0018* (2013.01); *H02J 7/025* (2013.01); *H05B 3/18* (2013.01); *H05B 3/34* (2013.01); *H05B 2203/021* (2013.01)

(56) References Cited

U.S. PATENT DOCUMENTS

| | | | | |
|---|---|---|---|---|
| 3,995,965 A * | 12/1976 | Cox | ......................... | E01C 11/26 404/71 |
| 4,779,673 A * | 10/1988 | Chiles | .................... | F16L 11/085 126/620 |
| 4,836,344 A * | 6/1989 | Bolger | ..................... | B60L 5/005 191/10 |
| 5,081,848 A * | 1/1992 | Rawlings | ................. | E01C 11/26 62/260 |
| 6,421,600 B1 | 7/2002 | Ross | | |
| 6,592,288 B2 * | 7/2003 | Chun | ......................... | E01C 1/00 238/14 |
| 9,022,190 B2 * | 5/2015 | Anders | .................... | B60L 5/005 191/10 |
| 9,285,125 B2 * | 3/2016 | Lee | ........................... | F24D 3/125 |
| 9,745,703 B2 * | 8/2017 | Curran | ................... | B60L 11/182 |
| 2001/0052307 A1 | 12/2001 | Pye et al. | | |
| 2008/0258014 A1 | 10/2008 | McCoskey et al. | | |
| 2013/0313249 A1 | 11/2013 | Cregut et al. | | |
| 2014/0151175 A1 * | 6/2014 | Vietzke | .................... | B60L 5/005 191/10 |
| 2015/0225906 A1 * | 8/2015 | Curran | ................... | B60L 11/182 404/1 |
| 2015/0246614 A1 * | 9/2015 | Dames | .................... | B60L 5/005 191/10 |
| 2017/0030039 A1 * | 2/2017 | Perez | ...................... | B60M 7/003 |

FOREIGN PATENT DOCUMENTS

| | | |
|---|---|---|
| GB | 2505516 A | 3/2014 |
| JP | 762620 A | 3/1995 |
| JP | 9242037 A | 9/1997 |
| JP | 1143992 A | 2/1999 |
| JP | 2003261908 A | 9/2003 |

OTHER PUBLICATIONS

Liu et al., "Modeling Snow Melting on Heated Pavement Surfaces. Part I: Model Development," Applied Thermal Engineering, 2007, pp. 1115-1124, vol. 27, ScienceDirect.

Liu et al., "Modeling Snow Melting on Heated Pavement Surfaces. Part II: Experimental Validation," Applied Thermal Engineering, 2007, pp. 1125-1131, vol. 27, ScienceDirect.

Ramsey et al., "Development of Snow Melting Load Design Algorithms and Data for Locations around the World," ASHRAE 926-RP Final Report, Jun. 11, 1999, 190 pages, vol. I, American Society of Heating, Refrigerating and Air-Conditioning Engineers.

* cited by examiner

SYSTEM FOR INDUCTIVE POWER TRANSFER, PAVEMENT SLAB ASSEMBLY AND METHOD OF OPERATING A SYSTEM FOR INDUCTIVE POWER TRANSFER

CROSS-REFERENCE TO RELATED APPLICATIONS

This application is the United States national phase of International Application No. PCT/EP2015/056835 filed Mar. 30, 2015, and claims priority to United Kingdom Patent Application No. 1406659.1 filed Apr. 14, 2014, the disclosures of which are hereby incorporated in their entirety by reference.

BACKGROUND OF THE INVENTION

Field of the Invention

The invention relates to a system for inductive power transfer to vehicles driving or standing on a surface of a route, in particular to road automobiles. Further, the invention relates to a pavement slab assembly for a route for vehicles comprising such a system. Further, the invention relates to a method of operating such a system, a method for building such a system, a method of building a pavement slab assembly and a method for building a route.

Description of Related Art

While travelling on a route vehicles require energy for driving (i.e. propulsion) and for auxiliary equipment which does not produce propulsion of the vehicle. Such auxiliary equipment includes, for example, lighting systems, heating and/or air-conditioning systems, ventilation and passenger information systems. Not only track-bound vehicles (such as trams), but also road automobiles can be operated using electric energy. If continuous electric contact between the travelling vehicle and an electric rail or wire along the route is not desired, electric energy can be either withdrawn from an on-board energy storage or can be received by induction from an arrangement of electric lines of the route.

The transfer of electric energy to the vehicle by induction forms a background of the invention. A route-sided conductor arrangement (primary winding structure) of a primary-sided system of the system for inductive power transfer produces an electromagnetic field. The field is received by a secondary winding structure integrated into a receiving device on board of the vehicle so that the field produces an electric voltage by induction. The transferred energy may be used for propulsion of the vehicle and/or for other purposes such as providing the auxiliary equipment of the vehicle with energy.

In some situations, winter contaminants such as snow, slush or ice may settle on a reference surface, e.g. a surface of the route, assigned to the primary winding structure of a system for inductive power transfer. Such contaminants, in particular if cumulated on said surface, can create a layer which will block a receiving device, e.g. of a vehicle, when moved over said reference surface in order to initiate inductive power transfer. Further, such contaminants can cause a misalignment in between a primary winding structure and a secondary winding structure, in particular if the vehicle is tilted due to e.g. the aforementioned layer. For instance, one or more wheels of the vehicle can be arranged on a layer of contaminants, wherein the remaining wheels are arranged directly on the surface. Such a misalignment can reduce the power transfer efficiency.

There are two strategies currently available to alleviate hazardous conditions due to the presence of winter contaminants on pavement surfaces.

Mechanical methods include e.g. snowplows, brooms, and snow sweepers to remove snow, slush or ice from priority areas. These equipments operate at relatively slow speeds and may interfere with the traffic and the usual activities in the places they are used. Wet snow and ice can develop a strong bond, making mechanical means of removal difficult or inefficient. A major drawback is that they are working from the surface down, not at the point of bonding. Mechanical methods can be damaging to the pavement and imbedded lighting fixtures. Chemical treatments include solid chemical dispersal and liquid spraying equipment for a variety of de-icing and anti-icing chemicals. This method can reduce or prevent the contaminant bonding to the pavement surface. The use of some of the chemical agents must be limited, however, because of environmental restrictions, or because environmental remediation efforts are costly. Other disadvantages include the downtime of the movement areas while the chemicals are applied and become effective; the detrimental effect on pavements and the electrical systems; and the maintenance and calibration of the equipment.

Also known are heated pavement systems which offer an alternative strategy for effectively mitigating the effects of winter contaminants by melting snow and preventing bonding to the pavement surface. Benefits can include enhanced safety, positive impact on winter operations, reduction in environmental impacts of chemical deicers, and significant decline in snow removal times required to clear priority areas. The disadvantages of heated pavement systems typically involve high initial costs and complex installation procedures. Costs may be offset by a reduction in traditional strategies that use more equipment and personnel.

Heating pavements from within the pavement structure can be accomplished by passing electric current or circulating warm fluids through pipes, or tubes, in the pavement structure.

In electrical heating systems, an electrical current encounters resistance when flowing through a conductor. The resistance to current flow converts electrical energy to heat energy. The heat produced is proportional to the current flowing through the conductor and the composition of the conductor that offers resistance to the current flow. Two forms of electric heating are used for in-pavement snow melting applications. In a first form, insulated conductors are embedded in the pavement, such as heating cables or grid/mesh mats. In another form, conductive materials are added to the pavement material mix, electrical energy is applied through the uninsulated conductors, and the pavement serves as heat source.

Also known are hydronic heating systems. Hydronic refers to the use of a heated fluid as a transfer medium. The heat is released by thermal conduction. Heated fluids flow through tubes, or pipes, embedded in the pavement structure. The cooled fluid is returned to the heat source and the cycle repeated. Heated fluids can come from a variety of sources, e.g. the direct-use of geothermal water, ground source heat pumps, heat exchangers, or boilers. Alternative heat sources, such as waste heat, can be used in some cases.

GB1215759.0 (not yet published) discloses a pavement slab assembly for a route for vehicles driving or standing on a surface of the route. The pavement slab assembly consists at least partially of pavement material. Further, the pavement slab assembly comprises a cable bearing element adapted to position and/or to hold a plurality of line sections of one or more electric lines. The cable bearing element is arranged within the pavement slab assembly such that the cable bearing element is enclosed by the pavement material.

SUMMARY OF THE INVENTION

It is an object of the present invention to provide a system for inductive power transfer to vehicles, in particular to road automobiles, which reduces a decrease of the power transfer efficiency due to winter contaminants.

Another object of the present invention is to provide a pavement slab assembly for building a route for vehicles, wherein the route is robust, durable and installable with low effort and also reduces said negative effects. Another object of the invention is to provide a method of operating such a system for inductive power transfer, a method for building a system, a method of building a pavement slab assembly and a method for building a route.

It is a basic concept of the invention to integrate a heating system into the system for inductive power transfer, wherein all elements of the heating system which are arranged within a field volume of a primary winding structure of the system for inductive power transfer are non-metallic elements. Preferably, all elements of the heating system are also non-magnetic elements.

A system for inductive power transfer to vehicles driving or standing on a surface of a route, in particular to road automobiles, is proposed. The system can also be referred to as primary-sided system or primary system. This means that the proposed system provides a primary side part of the system for inductive power transfer.

The system comprises a primary winding structure for generating an alternating electromagnetic field. The electromagnetic field can also be referred to as power transfer field. The power transfer field can consist of the electromagnetic field generated by the primary winding structure and, if a secondary winding structure of a receiving device is arranged above the primary winding structure, also an alternating electromagnetic field generated by the secondary winding structure, e.g. due to a current in the secondary winding structure induced by the electromagnetic field generated by the primary winding structure. Thus, the power transfer field can result from a superposition of two alternating electromagnetic fields.

The primary winding structure can be provided at least partially by one or more electric lines or cables. The one or more electric lines of the primary winding structure can extend in a common plane, in particular in a flat plane.

A field volume is assigned to the primary winding structure. The field volume can denote the volume which is filled with at least a portion of the magnetic part of the electromagnetic field generated by the primary winding structure or the aforementioned power transfer field. The field volume can e.g. denote the volume which is filled with at least 80%, 90% or 95% or even 100% of the electromagnetic field. In particular, the field volume can comprise all field lines of the electromagnetic field or at least a predetermined percentage, e.g. 80%, 90% or 95% of the field lines. In this context, the term comprises means that field lines of the magnetic part of the electromagnetic field which is comprised by the field volume do not extend outside the field volume.

According to the invention, the system comprises at least a part of a first heating system, wherein elements, in particular all elements, of the first heating system which are arranged within the field volume are non-metallic elements. In particular, one or more element(s) of the first heating system can be arranged within the field volume. In particular, the elements of the first heating system which are arranged within the field volume can also be non-magnetic elements.

A heating system denotes a system by which thermal energy, e.g. in form of heat, can be delivered, in particular to a reference surface of the system. A heating system can comprise active elements and passive elements. The first heating system can also comprise at least one other part which is arranged outside field volume and/or the proposed system. In particular, the part of the first heating system which is comprised by the proposed system is built separate from the primary winding structure.

It is possible that all elements of the first heating system, in particular all elements of the first heating system which are arranged within the field volume, are arranged with a predetermined distance or at least a minimal predetermined distance from the reference surface along a first direction, e.g. a distance smaller than 0.2 m, preferably a distance in a distance interval of 0.03 m to 0.1 m, 0.02 m to 0.1 m or even 0.01 m to 0.1 m.

It is also possible that elements of the first heating system which are arranged within a safety volume are non-metallic elements. The safety volume can comprise the aforementioned field volume, wherein the safety volume is larger than the field volume. The safety volume can have a predetermined geometric shape, e.g. a cuboid shape, a spherical shape or a cylindrical shape. In particular, the safety volume can be chosen or designed such that the minimal distance of an enveloping surface of the field volume to an enveloping surface of the safety volume is larger than a predetermined distance.

The primary winding structure of the proposed system can be arranged under a surface of the route or on a surface of the route. It is for instance possible that the primary winding structure is arranged within a charging pad which is installed on the surface of the route (elevated charging pad). In this case, the system can comprise a housing, wherein the primary winding structure is arranged within housing.

Alternatively, the primary winding structure of the system can be arranged under a surface of the route. In this case, the primary winding structure can be integrated into material providing the route or a layer of the route. As will be explained later in more detail, the primary winding structure can be arranged within a pavement slab assembly for a route for vehicles driving or standing on a surface of a route. In this case, the proposed system or at least the primary winding structure of the system can be a part of said pavement slab assembly. It is also possible that the proposed system is designed as or provided by such pavement slab assembly.

In the context of this invention, the following coordinate system can be defined. The first direction can denote a main direction of propagation of the electromagnetic field generated by the primary winding structure, wherein the direction is directed from the primary winding structure to a receiving device. For example, the first direction can be oriented perpendicular to the surface of the route, in particular a flat portion of the surface of the route. More particular, the first direction can be oriented perpendicular to the aforementioned reference surface. Further, the first direction can be oriented from the primary winding structure towards a vehicle. The first direction can be a vertical direction. A second direction can correspond to a direction of extension of the primary winding structure. Also, the second direction can correspond to a central axis of symmetry of the primary winding structure. The second direction is oriented perpendicular to the first direction. Further, the first direction can correspond to a direction of travel if a vehicle travels straightforward on the route. A third direction can be oriented perpendicular to the first and the second direction. In the following, the first direction will also be referred to as vertical direction, the second direction will also be referred to as longitudinal direction and the third direction will also be referred to as lateral direction.

In the context of this invention, directional terms such as above, under, upper can refer to the proposed coordinate system, in particular to the first direction.

The feature that elements of the first heating system which are arranged within the field volume are non-metallic elements can be equivalent to the following features. A reference surface can be assigned to the primary winding structure, wherein the reference surface is arranged at the transition of the system, in particular a primary unit of the system, to air. In particular, the reference surface provides a boundary surface to an air gap between the primary side part of the system for inductive power transfer and a receiving device. The reference surface can e.g. be provided by at least a portion of an upper surface of a housing which comprises the primary winding structure, especially in the case if the primary winding structure is installed on the surface of the route, e.g. in case of the aforementioned elevated charging pad. Alternatively, the reference surface can be provided by at least a portion of an upper surface of the route, in particular an upper surface of a pavement slab assembly, especially in the case wherein the primary winding structure is arranged under the surface of the route.

The reference surface can comprise or can correspond to a first area, wherein the first area is provided by an area which encloses or is bordered by outer edges of the field volume or the safety volume within a section through the field volume or safety volume in a section plane which comprises the reference surface. Then, elements of the first heating system which, if projected onto the reference surface along the first direction, are arranged within the first area are non-metallic elements. In other words, the elements of the first heating system which are, if projected onto the reference surface along the first direction, arranged in a cutting area of the field volume or safety volume in a section plane which comprises the reference surface are non-metallic elements.

It is also possible that the primary winding structure is at least partially, preferably fully, more preferably exceedingly, arranged within the first area if the primary winding structure is projected onto the reference surface along the first direction. The first area can also enclose the primary winding structure which is projected onto the reference surface.

The first area can also have a predetermined geometric shape, in particular a rectangular shape with predetermined dimensions. In this case, the first area can have a predetermined width and length.

Furthermore, it is possible that a predetermined portion of field lines of (the magnetic part of) the electromagnetic field can extend through the first area, e.g. at least 80%, 90% or 95%.

The first area can also be referred to as charging surface.

The first, and also another heating system which will be explained later, should be designed and/or arranged such that thermal energy supplied by the first and/or the other heating system can be transferred to the reference surface of the primary winding structure such that a temperature of at least a portion or point of the reference surface is higher than or equal to a predetermined temperature, in particular higher than 0° C.

The heat requirement of the heating system(s), or design load, is required for sizing systems and equipment and can e.g. depend on atmospheric factors, thermal conductivity, a classification of heat expectations, a mass transfer rate and an expected efficiency.

Atmospheric factors can include a rate of snowfall, an air temperature, a relative humidity, and a wind velocity. Further, it can be necessary to investigate various combinations of the climatic factors and trends that might occur at a site over time to avoid over or under designing the system. It is recommended to take into account an average of such factors over three to five years. The dimensions of the heated pavement slab affect heat and mass transfer rates at the surface. There are several possible approaches to design a snow and ice melting system. An expected efficiency can e.g. be classified according to the desired rate of heat delivery to the reference surface, and the type of controls used to initiate and terminate the melting operation.

The first, and also another heating system which will be explained later, should be designed such that it is capable of maintaining a predetermined surface condition of "no worse than wet", attaining a temperature of the reference surface above the freezing point, in particular before the start of expected snow accumulation, and maintaining surface temperature above the freezing point until snow accumulation has ceased.

Moreover, the first, and also another heating system which will be explained later, should be designed and/or arranged such the thermal energy supplied by the first and/or the other heating system which can be transferred to the reference surface, in particular to the first area, should be adapted to an expected rate of snowfall, air temperature, humidity, wind speed, dimensions, and characteristics of the pavement. For these purposes, established calculation methodologies can be applied. Also, back and edge losses should be considered. The heating system(s) should not cause electromagnetic interference (EMI).

A control of such heating system(s) should allow an automated activation. Further the heating system(s) should comprise at least one fluid temperature and/or pressure monitoring sensor.

The proposed system for inductive power transfer advantageously provides a system which allows transferring thermal energy to reference surface, e.g. the surface of the route or the surface of a charging pad, and in particular to the first area, while an interdependency between the first heating system and the electromagnetic field is minimized. In particular, there is no electromagnetic interaction between the first heating system and the electromagnetic field generated by the primary winding structure. This advantageously allows melting winter contaminants such as snow or ice while an inductive power transfer process is not or only minimally affected. The melting of the winter contaminants advantageously provides clean and flat surface for the vehicle in the region of inductive power transfer which, in turn, ensures a desired power transfer efficiency.

In another embodiment, the system comprises at least a part of at least one other heating system, wherein all elements of the other heating system are arranged outside the field volume. It is of course possible that all elements of the other heating system are arranged outside the aforementioned safety volume.

Also, if the elements of the other heating system are projected onto the previously described reference surface, said elements of the other heating system can be arranged outside the first area. In this case, the reference surface can comprise another area, wherein the other area encloses the first area at least partially, preferably fully. All elements of the other heating system are arranged within the other area but outside the first area if the elements are projected onto the reference surface along the first direction. The elements of the other heating system can comprise metallic elements, in particular electrically conductive elements. The elements of the other heating system can be arranged with a predetermined distance from the reference surface, e.g. a vertical distance in the range of 0.05 m and 0.08 m. The at least one other heating system can be provided by an electrical heating system. Such a system uses electricity as an energy source for in-pavement heating elements, e.g. in the form of resistive cables, grid-mesh/heat-mats, or conductive material mix designs for e.g. asphalt and/or Portland Cement Concrete (PCC). Heating element resistance and spacing of elements should be selected based upon manufacturer recommendations for design load and voltage.

If resistive conductors, e.g. a cable or electric line, are used, a voltage is applied to the conductor and current flows through the conductor and generates heat. Power output per unit length varies with the applied voltage and conductor resistance. Conductors are available with a wide selection of conductor resistances. The type of heating conductors selected may vary from mineral-insulated to self-regulating or constant-wattage conductors. Based on voltage and required cable length, a specific conductor with a resistance that provides the required power output can be selected. Dependent upon the conductor characteristics, placement depth is nominally 0.05 m to 0.08 m below the finished surface of asphalt or concrete to maintain the desired output. Conductor spacing is dictated primarily by the heat-conducting ability of the material in which the conductor is embedded. Concrete has a higher heat transmission coefficient than asphalt, permitting wider conductor spacing. Actual conductor spacing may vary between 0.08 m and 0.22 m for proper heat output.

Conductors may also be attached to plastic or fiber mesh to form a mat unit which can also be referred to as heating mat. Prefabricated factory-assembled mats are available in a variety of watt densities to match desired snow-melting capacities. Plastic or fiber-mesh heating mats can be tailored to follow contours and fit around objects. Mats should be installed 0.05 m to 0.1 m below the finished surface of asphalt or concrete. The mats should be placed at least 0.3 cm from a pavement edge. Adjacent mats should not overlap.

According to another option, conductive materials, such as graphite and carbon, can be added to the pavement material, e.g. asphalt or concrete mixes, during the pavement material mixing process. In such a material mix, less than 25 percent conductive materials can be used while the appropriate material specifications for strength and durability is still met.

For personnel safety and protection of equipment, an electrical heating system can be provided with a ground fault protection device. Equipment protection devices (EPD) with a trip level of 30 milliamps should be used to reduce the likelihood of nuisance tripping.

The first and the at least one other heating system can be operated independently of each other. Thus, two, in particular independent, heating systems are provided for transferring thermal energy to different areas of the reference surface, e.g. the surface of the route. Thus, a larger portion of the surface of the route can be heated while the aforementioned electromagnetic interaction between the heating systems and the electromagnetic field generated by the primary winding structure is still minimized.

In another embodiment, the first heating system is a hydronic heating system. In a hydronic heating system an operating fluid is used to transfer thermal energy to a desired area or location. In addition, the other heating system can be a hydronic heating system. This advantageously allows a transfer of thermal energy, e.g. heating of the reference surface, without using electrical elements or chemical substances.

In such a hydronic system, a heat source can provide the energy to heat an operating fluid circulating through a hydronic system. Various sources such as direct-use of geothermal hot water, underground thermal energy storage units (UTES units), boilers, and heat exchangers or a heat pump may be used. Geothermal heat pumps (GHPs) can be effectively used. However, knowledge of the specific geological and hydrological conditions and available land for the proposed site will help determine the best type of ground loop.

A heat source can use steam, hot water, gas, oil, or electricity. Heat may be available from secondary sources, such as power plants and other waste heat sources. Alternative energy resources may also be used with or without heat pumps or heat pipes. The design capacity of the heat source can e.g. be in the range of 600 to 950 W/h*$m^2$, which can also include back and edge losses. Design of the heat source should follow standard industry practice.

The amount and layout of available land, landscaping, and the location of underground utility systems can also contribute to system design. Horizontal ground loops (generally the most economical) are typically used for new construction with sufficient land. Vertical installations are often used because they minimize the disturbance to the landscape.

A material of the piping or tubing of a hydronic heating system may be metal, plastic, or rubber. Steel, iron, and copper pipes have long been used, but steel and iron may corrode rapidly. The use of salts for de-icing and elevated temperatures may accelerate corrosion of components. It should be considered that the hot asphalt may damage the material of the piping or tubing as asphalt is usually placed at above 150° C. in order to get adequate compaction. Also, the compaction process may deform and even break the piping or tubing and their connections. Procedures for testing the integrity of piping and connections can be implemented during the construction process during and immediately after placement of pavement materials.

When plastic pipe is used, the system must be designed so that the fluid temperature required will not damage the pipe. One solution to temperature limitations is to decrease the pipe spacing. Closer pipe spacing also helps eliminate striping of snow (unmelted portions between adjacent pipe projections on the surface).

Selected materials for piping, or tubing, must be compatible with pavement materials and construction techniques. Pipe, or tubing, spacing can be specified by the manufacturer in order to meet the design heat requirements specified and should result in pressure drops within nominal capacities of circulators as dictated by standard industry/engineering practices. Hydronic pipe or tube sizing can be selected to create a flow velocity between 0.6 m/s and 1.5 m/s unless otherwise recommended by the manufacturer and in accordance with standard industry/engineering practices.

The use of a heat exchanger to separate the pavement piping circuitry from the heat source may be advantageous to isolate additives, such as corrosion-inhibitors or antifreeze additives, from effecting ground discharge waters.

Heat pumps can circulate the ground source water provided by shallow wells or down-hole heat exchangers. The ground source water can pass through the heat pump to extract the heat from the ground. The cooler, heat-extracted waters can be returned back to the ground thus balancing this resource. The heat extracted and generated by the heat pump can be transferred to the operating fluid flowing through the pavement. A proper pump can be selected based on the fluid flow rate, energy requirements of the piping system, specific heat of the fluid, and viscosity of the fluid, particularly during cold start-up.

Design of the fluid circuitry can be determined by the system design flow rate and the differential pressure in the longest loop plus accumulated losses through valves, air separators, exchangers, etc. Select circulators can be determined based on the highest efficiency in mid-range performance.

Freeze protection can be added to the operating fluid as most systems will not operate continuously in subfreezing weather. Glycols (e.g. ethylene glycol and propylene glycol) can be used because of their moderate cost, high specific heat, and low viscosity. Ease of corrosion control is another advantage. Glycols should be tested annually to determine any change in reserve alkalinity and freeze protection. The piping or tubing should be designed for periodic addition of an inhibitor.

PCC or asphalt may be used with hydronic heated pavement systems, although pipe spacing and fluid temperatures will vary due to differences in thermal conductivity of asphalt and PCC.

A hydronic heating system can require fluid temperature control and flow control for safety and component longevity. Slab stress and temperature limits of the operating fluid, pipe components, and heat source should be considered. Bypass flow and temperature controls may be necessary to maintain recommended boiler temperatures. If a primary control fails, a secondary fluid temperature sensor should deactivate the heating system and possibly activate an alarm.

In another embodiment, the first and/or the other heating system comprise(s) at least one transporting means for an operating fluid. The operating fluid can e.g. be at least partially provided by water, a glycol, e.g. ethylene-glycol and/or propylene-glycol, or any other operating fluid. The operating fluid can be designed by a fluid with a freezing temperature lower than a predetermined temperature, e.g. 0° C., −5° C., −10° C., −15° C. or even a lower temperature. The transporting means can be arranged within a housing of the system, within the material providing the route or within the aforementioned pavement slab assembly.

The transporting means can e.g. be provided by a fluid line, in particular at least one hose or at least one pipe. It is possible that the at least one fluid line has a predetermined course or shape. For instance, the at least one fluid line can have a meandering course.

Moreover, the at least one transporting means can be arranged such that a desired transfer of thermal energy from the at least one transporting means to a desired part of the reference surface, e.g. the surface of the route, is ensured. The arrangement and/or design of the at least one transporting means comprises e.g. the design of a diameter of the transporting means and/or distance between different sections of the at least one transporting means.

The at least one transporting means can e.g. be made of rubber, in particular a synthetic rubber, and/or a polymer, in particular a flexible polymer.

This advantageously provides a heating system which is simple to integrate into an existing system for inductive power transfer.

In another embodiment, the system comprises at least one connecting means for connecting the at least one transporting means to an external fluid supply. The connecting means can e.g. be designed as inlet and/or outlet. The connecting means can be arranged in a housing of the proposed system or in a surface area of a pavement slab assembly. In particular, the connecting means can be installed at a bottom surface of housing or the pavement slab assembly.

A hydronic heating system can also comprise at least one means for controlling a fluid flow and/or pressure, e.g. at least one valve and/or at least one pumping means. Further, a hydronic heating system can also comprise at least one means for controlling a fluid temperature, e.g. at least one heat source, e.g. an electrically operated heat source such as a boiler and/or at least one heat pump. A heat pump can be used for transferring thermal energy from a first, colder medium to a second medium, wherein the second medium can e.g. be provided by the operating fluid. It is for instance possible that a hydronic heating system comprises a ground loop heat exchanger which is e.g. installed under a ground surface. Further, the hydronic heating system may comprise a heat pump for transferring thermal energy from the medium of/in the ground loop heat exchanger to the operating fluid of the part of the heating system which is comprised by the proposed system for inductive power transfer.

In another embodiment, the other heating system is an electric heating system. This advantageously allows a simple design of the other heating system.

In another embodiment, at least a part of the first heating system is arranged under and/or over the primary winding structure. In particular, the element(s) of the first heating system which is/are arranged within the field volume can be arranged under and/or over the primary winding structure.

In this context, it is possible that some elements of the first heating system are arranged under the primary winding structure and other elements are arranged over the primary winding structure. In particular, the primary winding structure and elements of the first heating system can be interweaved or interlaced. This advantageously allows a very compact design of proposed system. Also, thermal energy generated by the primary winding structure, in particular during operation of the primary winding structure, can be recovered by the first heating system. Said recovery can e.g. be due to the fact that a hydronic system with the operating fluid can be in direct contact with the primary winding structure and will be heated by the primary winding structure if the primary winding structure is operated as conductive elements of the primary winding structure generate heat during said operation. The proposed embodiment advantageously allows a simple installation of the first heating system within the proposed system.

In another embodiment, the system comprises a cable bearing element, wherein at least a part of the first heating system is arranged under or above the cable bearing element. The cable bearing element denotes an element for receiving the primary winding structure, in particular the electric line or lines providing at least a part of the primary winding structure. The cable bearing element can comprise recesses forming spaces and/or projections delimiting spaces for receiving at least one of the line sections. By using the cable bearing element, a desired course of the electric line or lines can be provided. Such a cable bearing element is for instance described in the aforementioned GB1215759.0. The proposed embodiment advantageously allows using an existing cable bearing element without modifying it while also allowing install a heating system.

In an alternative embodiment, the system comprises a cable bearing element, wherein at least a part of the first heating system is arranged within the cable bearing element. This can e.g. mean that at least a part of the first heating system is arranged within an inner volume which is enclosed by an enveloping surface of the cable bearing element.

It is possible to arrange the element(s) of the first heating system in different sections of the cable bearing element. It is e.g. possible to arrange the elements of the first heating system above the primary winding structure, e.g. on the top or in a top section of the cable bearing element. In this case, the element(s) of the first heating system is/are arranged close to the reference surface.

It is, however, also possible to arrange the elements of the first heating system under the primary winding structure, e.g. on a bottom of the cable bearing element or within a bottom section of the cable bearing element. In this case, the bottom surface of the cable bearing element can be modified in order to receive the elements of the first heating system. This advantageously allows using existing cable bearing elements, wherein elements of a heating system can be backfitted.

In another embodiment, the cable bearing element comprises receiving means for receiving at least a part of the first heating system. The cable bearing element can e.g. comprise receiving means for receiving at least one element of the first heating system, e.g. for receiving or providing the aforementioned transporting means, in particular for receiving a pipe or a hose or providing a tunnel. The receiving means can e.g. be designed as recesses, grooves or cut-outs or tunnels within the cable bearing element.

This advantageously provides guiding means for elements of the first heating system by which a desired geometric arrangement of elements of the first heating system can be provided and ensured.

In another embodiment, the system comprises at least one thermal insulation element, wherein the at least one thermal insulation element is arranged under the part of the first heating system and/or the other heating system.

Thus, the transfer of thermal energy from the heating system(s) away from the desired area of the reference surface is minimized. This, in turn, maximizes the transfer of thermal energy to the reference surface.

In another embodiment, the system comprises at least one temperature sensor for sensing a temperature of the reference surface and/or at least one snow sensor and/or at least one ambient temperature sensor. Output signals generated by at least one of said sensors can be used in order to control an operation of the proposed system. It is of course possible, that the proposed system comprises a control unit for controlling the operation of the first and/or at least one other heating system.

Further, the proposed system can comprise the aforementioned means for controlling a fluid flow and/or means for controlling a fluid temperature. Further, the proposed system can comprise a power supply unit for supply electrical power to an electrical heating system.

Further proposed is a pavement slab assembly for a route for vehicles driving or standing on a surface of the route, in particular for road automobiles. The pavement slab assembly consists at least partially of pavement material, e.g. concrete. Further, the pavement slab assembly comprises a system according to one of the previously described embodiments.

Thus, a pavement slab assembly for a route for vehicles driving or standing on a surface of the route is proposed, wherein the pavement slab assembly consists at least partially of pavement material, wherein the pavement slab assembly comprises a primary winding structure for generating an alternating electromagnetic field, wherein a field volume is assigned to the primary winding structure. Further, the pavement slab assembly comprises at least a part of a first heating system, wherein elements of the first heating system which are arranged within the field volume are non-metallic elements.

In this case, the pavement slab assembly, in particular an upper surface of the pavement slab assembly, can provide a portion of the surface of the route which can also provide the reference surface. The aforementioned first area and the aforementioned other area can be arranged within this reference surface. Further, the pavement slab assembly can comprise at least a part of at least one other heating system, at least one transporting means for an operating fluid, at least one connecting means for connecting the at least one transporting means to an external fluid supply, a cable bearing element, at least one thermal insulation element, at least one temperature sensor and/or at least one snow sensor and/or at least one ambient temperature sensor as described with reference to the proposed system. The aforementioned elements can be integrated into the pavement slab assembly. This can e.g. mean that an element is arranged within the pavement slab assembly such that it is enclosed at least partially by pavement material. In particular, the part of the first heating system and/or the part of the at least one other heating system, more particular the at least one transporting means, can be integrated into or be arranged within the pavement slab assembly.

Further, the pavement slab assembly can comprise a positioning element, in particular a non-metallic positioning element. The positioning element can e.g. be designed as an armoring element. The positioning element can e.g. be designed as an armoring mesh. The positioning element can be used to provide a predetermined, fixed position of elements of the first and/or the at least one other heating system, in particular before and during casting of pavement material. In other words, the positioning element can be used to fix or retain the elements of the first and/or the at least one other heating system in predetermined position with regard to e.g. a casting mould during the casting process. The positioning element and the elements of the first and/or the at least one other heating system can be arranged such that the elements of the first and/or the at least one other heating system is positioned at a predetermined position within the pavement slab assembly. The positioning element and the elements of the first and/or the at least one other heating system can be mechanically connected. The positioning element can e.g. be designed and/or arranged such that the elements of the first and/or the at least one other heating element are disposed or positioned at a desired distance from the upper surface of the route, e.g. the aforementioned reference surface. It is of course possible that the pavement slab assembly comprises a plurality of positioning elements.

It is possible that the positioning elements are arranged within the pavement slab assembly. Alternatively, in particular if the positioning element is provided by an armoring element, the positioning element can extend out of the pavement slab assembly. In this case, the part of the positioning element outside the pavement slab assembly can be used to ensure a predetermined fixed position of parts of the first and/or the at least one other heating system which are arranged outside the pavement slab assembly. In particular, parts of the first and/or the at least one other heating system which are arranged outside the pavement slab assembly can be mechanically fixed to the part of the positioning element outside the pavement slab assembly. Thus, a risk of damaging elements of a heating system at a transition from the pavement slab assembly to an exterior volume, e.g. due to a movement of the pavement slab assembly, is reduced.

In general, the positioning element can provide a supporting or fixation means for the elements of the first and/or the at least one other heating system inside and/or outside the pavement slab assembly.

If the heating system is integrated into the pavement slab assembly, the characteristics of the pavement, e.g. the thermal conductivity, heat transfer, and evaporation rates, should be taken into account for the design of the heating system(s). This means that the thermal power needed to e.g. melt snow can be determined based on the characteristics of the pavement. Also, it can be taken into account if the pavement is flexible, e.g. asphalt, or rigid, e.g. concrete. Further, it should be considered if the surface of the pavement slab assembly is sloped or grooved.

Also, an adequate surface drainage means should be provided which allows the runoff from the heated reference surface without damaging facilities or unduly saturating of the subsoil. A detailed estimate of melted runoff and how it will be stored and/or removed from the operations area should be included in the design.

The minimal distance of a part of the first and/or the second heating system which is integrated into the pavement material of the pavement slab assembly from the surface of the pavement slab assembly can e.g. be chosen in a range of 0.05 m to 0.08 m. This can result in a limitation which is provided by the thickness of the surface layer in which the system should be placed. The distance, however, can be chosen depending on the durability of the part of the first and/or the second heating system, the thermal transmission efficiency and the technical construction feasibility.

Further proposed is a method of operating a system according to one of the previously described embodiments. According to the invention, the first heating system and/or the other heating system is activated, wherein thermal energy is transferred to at least a portion of a reference surface of the primary winding structure.

A heating system can be activated during the operation of the primary winding structure and/or before and/or after an operation of the primary winding structure.

This advantageously allows heating the reference surface assigned to the primary winding structure which, as previously explained, reduces the risk of a decrease of the power transfer efficiency due to winter contaminants.

In another embodiment, the first heating system and/or the other heating system is operated depending on a temperature of a reference surface of the primary winding structure and/or an ambient air temperature and/or depending on a presence of a winter contaminant, e.g. snow, on the reference surface. It is for instance possible that the heating system is operated if the temperature of the reference surface and/or the ambient air temperature is/are smaller than a predetermined threshold temperature, e.g. +4° C., +2° C. or 0° C. or even a lower temperature. It is also possible that the heating system is alternatively or additionally operated if snow or ice or slush is present on the reference surface.

It is, of course possible, to operate a heating system even if no snow is present on the reference surface. This can e.g. be done in order to ensure a surface temperature which is higher than a predetermined temperature, e.g. 0° C. for preventing snow or ice or slush to settle or accumulate on the reference surface.

Depending on the ambient air temperature, the heating system(s) can be deactivated when the ambient temperature rises above a predetermined temperature, e.g. as an automatic protection against accidental operation in summer or mild weather. This advantageously provides an operating scheme of the heating system(s) adapted to winter conditions.

In another embodiment, the first heating system and/or the at least one other heating system is/are operated if a winter contaminant is predicted, in particular if no winter contaminant is present on the reference surface. It is for instance possible that a control unit of a heating system receives an activation signal if a winter contaminant such as snow is predicted, e.g. by evaluating weather forecast information. Upon reception of the activation signal, the heating system is operated. This advantageously prevents snow, ice or slush to settle on the reference surface.

In another embodiment, the first heating system and/or the at least one other heating system is/are operated such that a temperature of at least a portion or point of the reference surface of the primary winding structure is higher than or equal to a predetermined temperature, in particular higher than 0° C.

In this case, a fluid flow and/or a fluid temperature can be controlled in order to achieve said effect. Also, an electric power supplied to an electric heating system can be controlled. Set point(s) can be established to automatically cycle the system between predetermined temperatures. It may be necessary to provide sufficient lead time in order to reach a desired temperature e.g. if the reference surface has been below freezing before a storm event. Automating the activation of the heating system(s) before the accumulation of snow allows ample warm-up time and reduces the probability of thermal stress in pavement and equipment.

For efficiency and reduction of operating costs, the aforementioned controls should be incorporated in the pavement heating system to provide this lead time.

This advantageously prevents winter contaminants to settle on the reference surface.

Further proposed is a method for building a system for inductive power transfer to vehicles driving or standing on a surface of a route, in particular to road automobiles, wherein the following steps are performed:
providing a primary winding structure, wherein a field volume is assigned to the primary winding structure,
providing at least a part of a first heating system,
arranging elements of the first heating system, e.g. in a housing or in a pavement slab assembly such that elements of the first heating system which are arranged within the field volume are non-metallic elements.

Further steps can be performed in order to provide a system according to one of the previously described embodiments. This advantageously allows building a system according to one of the previously described embodiments.

Further proposed is a method for building a pavement slab assembly, wherein the following steps are performed:
providing a casting mould,
providing a primary winding structure, wherein a field volume is assigned to the primary winding structure,
arranging the primary winding structure within the casting mould,
casting pavement material into the casting mould,
characterized in that the method further comprises the steps of providing at least a part of a first heating system,
arranging elements of the first heating system within the casting mould, wherein elements of the first heating system which are arranged within the field volume are non-metallic elements.

Further steps can be performed in order to provide a pavement slab assembly according to one of the previously described embodiments. This advantageously allows building a pavement slab assembly according to one of the previously described embodiments.

Further proposed is a method for building a route for vehicles driving or standing on a surface of the route, in particular for road automobiles, wherein the following steps are performed:
providing a plurality of pavement slab assemblies according to the previously described method,
installing the pavement slab assemblies on a prepared base or foundation such that a driving surface or standing surface for vehicles which are driving or standing on the route is provided.

This advantageously allows building route with the previously described advantages of a pavement slab assembly.

BRIEF DESCRIPTION OF THE DRAWINGS

Examples and preferred embodiments of the invention will be described with reference to the attached figures which show.

DESCRIPTION OF THE INVENTION

Figure 1:
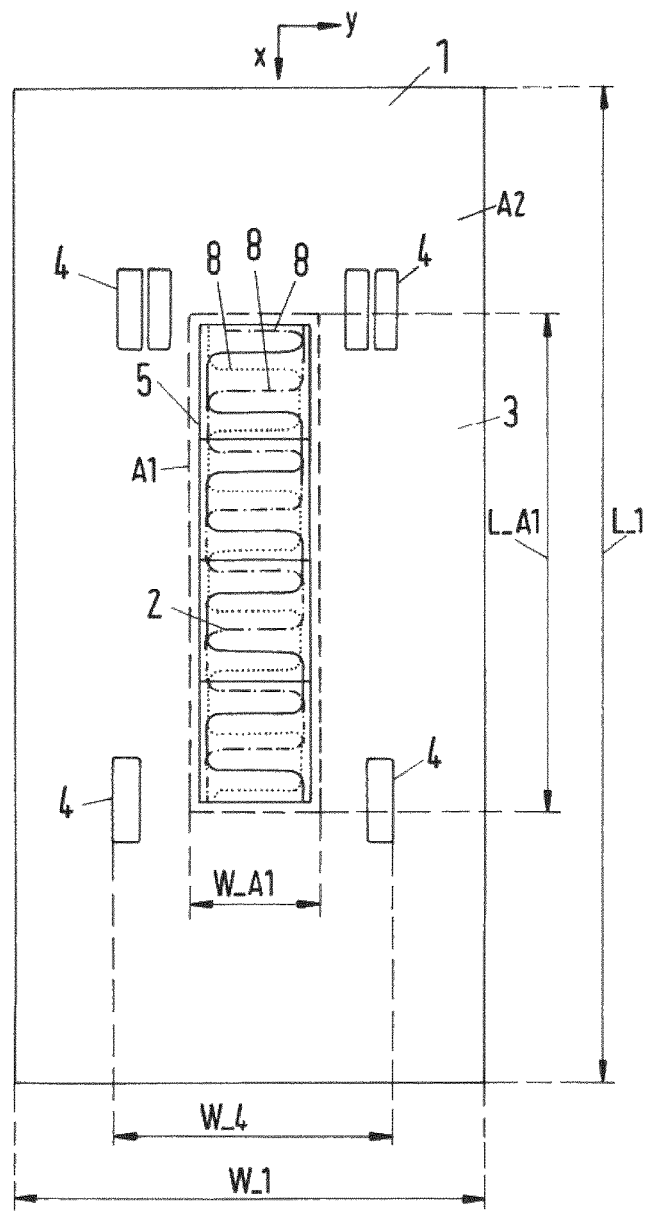
FIG. 1 a top view on a pavement slab assembly,
FIG. 2 a cross section through the pavement slab assembly shown in FIG. 1,
FIG. 3 a cross section through a pavement slab assembly according to a first embodiment of the invention,
FIG. 4 a cross section through a pavement slab assembly according to a second embodiment of the invention,
FIG. 5 a cross section through a pavement slab assembly according to a third embodiment of the invention,
FIG. 6 a cross section through a pavement slab assembly according to a fourth embodiment of the invention and
FIG. 7 a top view on a pavement slab assembly.

FIG. 1 shows a top view on a pavement slab assembly 1. The pavement slab assembly 1 comprises a primary winding structure 2. It is shown that the primary winding structure 2 comprises three phase lines which extend along a longitudinal direction x in a meandering course. The phase lines are provided by electric lines 8.

Figure 2:
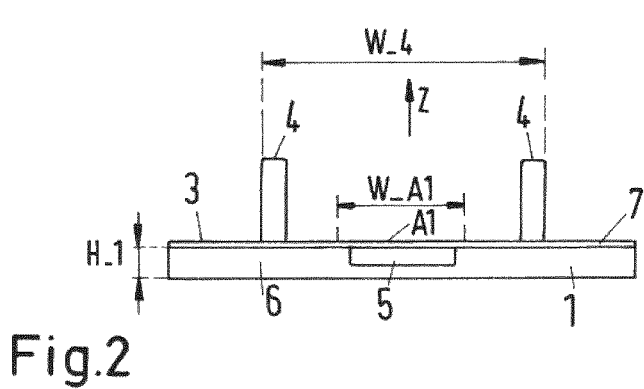

The primary winding structure 2, in particular the phase lines, are arranged under an upper surface 3 of the pavement slab assembly 1 (see FIG. 2). The upper surface 3 provides a reference surface of the primary winding structure 2. The upper surface 3 comprises a first area A1 with a rectangular shape. The phase lines of the primary winding structure 2 are arranged within the first area A1 if the primary winding structure 2 is projected onto the upper surface 3 along a vertical direction z (see FIG. 2). The first area A1 can e.g. be enclosed by an envelope of the primary winding structure 2 which is projected into the upper surface 3. Further shown is a cable bearing element 5 which comprises the primary winding structure 2 (see FIG. 1). It is shown that the width W_A1 is larger than a width of the cable bearing element 5.

Although it is shown that the phase lines are completely arranged within the first area A1, it is possible that a section of the phase lines, e.g. connecting sections to an external power supply, or terminal sections of the phase lines, are arranged outside the first area A1. It is, however, important that the first area A1 comprises the sections of the phase lines of the primary winding structure 2 which generate the electromagnetic field or at least a major portion, e.g. 80%, 90% or 95% of the electromagnetic field.

Further shown is a lateral direction y which is oriented perpendicular to the longitudinal direction x. A plane spanned by the longitudinal direction x and the lateral direction y is oriented parallel to the upper surface 3. The first area has a predetermined length L_A1, wherein the length is measured along the longitudinal direction x. The length L_A1 can e.g. be 3.6 m. The length L_A1 of the first area A1 can be larger than the length of the cable bearing element 5.

Further shown is another area A2 of the upper surface 3 which encloses the first area A1. In the embodiment shown, the other area A2 comprises the remaining parts of the upper surface 3 of the pavement slab assembly. In particular, the primary winding structure 2 is not arranged within the other area A2 if projected to the upper surface 3 along the vertical direction z.

The pavement slab assembly 1 has a predetermined length L_1. The length L_1 of the pavement slab assembly 1 can e.g. be 7.5 m. Also shown is the pavement slab assembly 1 has a predetermined width W_1. The width W_1 can e.g. be 3.5 m. Further shown are wheels 4 of a vehicle, e.g. a bus. A width W_4 of the vehicle can be smaller than the width W_1 of the pavement slab assembly 1 and/or larger than the width W_A1 (see FIG. 2) of the first area A1. The width W_4 of the vehicle can e.g. be 2.195 m. It is, however, also possible that the width W_4 of the vehicle can be larger than the width W_1 of the pavement slab assembly 1 or smaller than the width W_A1 of the first area A1.

The dimensions of the first and the second area A1, A2 can be chosen such that a vehicle to be charged can be completely arranged above the second area A2 or a portion thereof. This feature, however, is not a mandatory feature. The second area A2 can e.g. be chosen as large as the street lane and at least as long as the vehicle itself.

FIG. 2 shows a cross section through the pavement slab assembly 1 shown in FIG. 1. It is shown that the wheels 4 of the vehicle (not shown) can be arranged on the upper surface 3 of the pavement slab assembly 1.

An upper surface of the cable bearing element 5 is arranged with a predetermined distance from the upper surface 3 of the pavement slab assembly 1 along the vertical direction z. Thus, also the primary winding structure 2 is arranged with a predetermined distance from the upper surface 3 of the pavement slab assembly 1 along the vertical direction z.

It is shown that the pavement slab 1 consists of a slab body 6 and a surface layer 7. The surface layer 7 is arranged above the body 6 and provides the surface area 3. The body 6 has a cuboid shape with a length L_1, a width W_1 (see FIG. 1) and a height H_1. The height H_1 can e.g. be 0.215 m. The surface layer 7 features the same length L_1 and width W_1 and has a height H_7. A height H_7 of the surface layer 7 can e.g. be 0.035 m. The cable bearing element 5 is integrated into the body 6 and covered by the surface layer 7.

Further indicated is the first area A1 on the surface area 3 provided by the surface layer 7.

Figure 3:
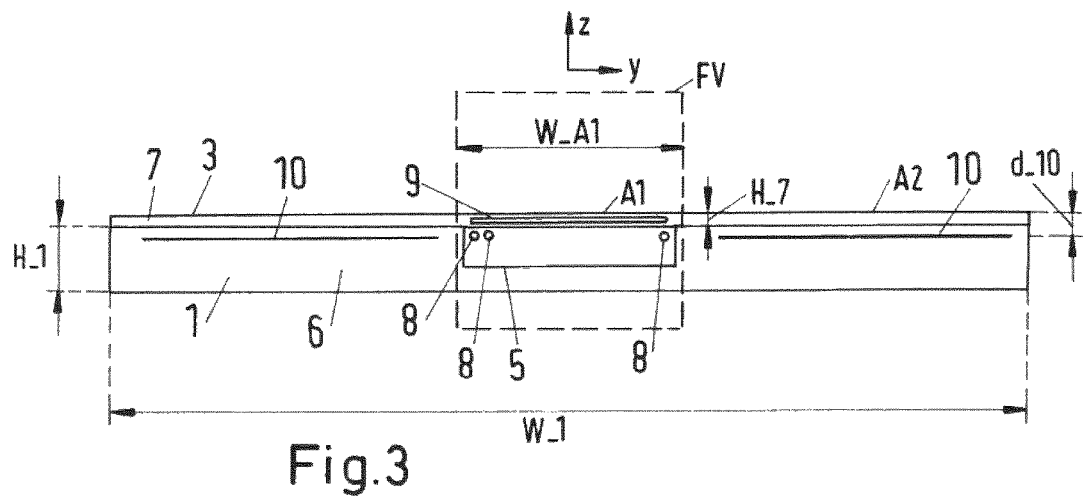

FIG. 3 shows a cross section section of a pavement slab assembly 1 according to a first embodiment of the invention. The pavement slab assembly 1 is mostly designed as shown in FIG. 1 and FIG. 2. In the cross section shown in FIG. 3, electric lines 8 which provide the primary winding structure 2 are shown exemplarily. It is shown that the electric lines 8 are arranged in a top portion of the cable bearing element 5 with respect to the vertical direction z.

Further indicated is the first area A1 on the surface area 3 provided by the surface layer 7. The first area A1 has a width W_A1. It is shown that the width W_A1 of the first area A1 is larger than the width of the cable bearing element 5 along the lateral direction y. Not shown is a length of the first area L_A1 (see FIG. 1). Thus, if the cable bearing element 5 (and the electric lines 8 guided by the cable bearing element 5) are projected onto the surface area 3 along the vertical direction z, they are arranged within the first area A1. The first area A1 can also be referred to as charging area.

A field volume FV assigned to the primary winding structure 2 can e.g. be given by a cuboid volume, wherein the height of the cuboid volume extends along the vertical direction z and the length and width of the cuboid volume are chosen such that the cuboid volume comprises the first area A1. The height of the cuboid volume can be larger than the sum of the height H_1 of the body 6 and the height H_7 of the surface layer 7. In FIG. 3, the field volume FV is indicated by dashed lines. The primary winding structure 2 can be arranged in the centre of the field volume FV, in particular with respect to the vertical direction z.

In contrast to the pavement slab assembly 1 shown in FIG. 1 and FIG. 2, the pavement slab assembly 1 shown in FIG. 3 comprises a part of a first heating system. Within the cross section shown in FIG. 3 piping elements 9 of the first heating system are shown. Also shown are elements 10 of a second heating system.

The first heating system is designed as a hydronic heating system. The piping elements 9 can e.g. be provided by pipes or hoses. It is shown that the piping elements 9 are arranged within the field volume FV. In particular, if projected onto the surface layer 3 along the vertical direction z, the piping elements 9 are arranged within the first area A1.

With respect to the vertical direction z, the piping elements 9 are arranged above primary winding structure 2 (see FIG. 1), in particular above the electric lines 8 providing the primary winding structure 1. Further shown is that the piping elements 9 are arranged above a top surface of the cable bearing element 5 with a predetermined distance (not shown). The piping elements 9 are integrated into the surface layer 7. In this context, this can mean that pavement material is arranged in between the surface area 3 provided by an upper surface of the surface layer 7 and the piping elements 9 and in between a bottom surface of the surface layer 7 and the piping elements 9. The piping elements 9 are not integrated into the cable bearing element 5.

An operating fluid (not shown) can flow through the piping elements 9. The operating fluid can be provided to the piping elements 9, in particular to an inlet of the piping elements (not shown), with a predetermined temperature. Thus, thermal energy can be transferred from the operating fluid flowing through the piping elements 9 to an environment of the piping elements 9 and, in particular to the first area A1 of the surface area 3.

It is shown that the piping elements 9 are arranged with a predetermined (small) distance from the surface area 3 along the vertical direction z. The distance can be, in particular, chosen such that a desired transfer of thermal energy to the surface area 3, in particular the first area A1, can be provided.

The piping elements 9 are made of non-metallic material. Further, the material of the piping elements 9 can have a predetermined thermal conductivity.

In the embodiment shown in FIG. 3, the cable bearing elements 5 and the primary winding structure 2 carried by the cable bearing element 5 can be used according to their actual design concept. Thus, no modification of the cable bearing element 5 is necessary. However, the height H_7 of the surface layer may be incremented, in order to be able to integrate the piping elements 9.

The elements 10 of the second heating system can e.g. be provided by resistive cables having a predetermined resistance. In this case, the second heating system is provided by an electric heating system. If electric power is supplied to such cables, a current will flow through the cables and thermal energy will be generated. The generated thermal energy can also be transferred to the surface area 3, in particular to the second area A2 (see FIG. 1).

It is shown that the elements 10 of the second heating system are arranged outside the field volume FV. In particular, if projected onto the surface layer 3, the elements 10 of the second heating system are arranged outside the first area A1 but within the second area A2 (see FIG. 1).

Alternatively, elements 10 of the second heating system can be provided by piping elements, e.g. pipes or hoses. In this case, the second heating system can be provided by a hydronic heating system, wherein an operating fluid with a predetermined temperature is supplied to the piping elements and thermal energy is transferred from the piping elements 10 to an environment of the piping elements, in particular to the surface area 3, more particular to the second area A2. In this case, the piping elements 9 and the elements 10 can be parts of a single hydronic heating system which e.g. comprises a common heat source and/or pumping means. Further, elements 10 and piping elements 9 can provide different sections of the same fluid circuitry in this case. Also, fluid control means such as valves can be designed and/or arranged such that a fluid flow through the different sections of the fluid circuitry can be controlled individually.

Alternatively, the piping elements 9 and the elements 10 can be parts of two independent hydronic heating systems. In this case, the first and the second heating system can be separate systems which can e.g. be controlled individually.

It is shown that the elements 10 of the second heating system are integrated into the body 6. In this context, this can mean that pavement material is arranged in between a top surface of the body 6 and the elements 10 and in between a bottom surface of the body 6 and the elements 10. Further shown is that the elements 10 are arranged with a predetermined distance d_10 from the surface area 3. The distance d_10 can e.g. be chosen from a range of 0.05 m to 0.08 m.

In general, it is also possible that only a single heating system is provided, wherein parts of the single heating system are arranged within the field volume FV, e.g. within the first area A1 if projected onto the surface area 3 along the vertical direction z, and other parts of the single heating system are arranged outside the field volume FV, e.g. within the second area A2 if projected onto the surface area 3 along the vertical direction z. In this case, it is important that the elements of the single heating system which are arranged within the field volume FV, e.g. the first area A1 if projected onto the surface area 3 along the vertical direction z, are made of non-metallic material.

Figure 4:
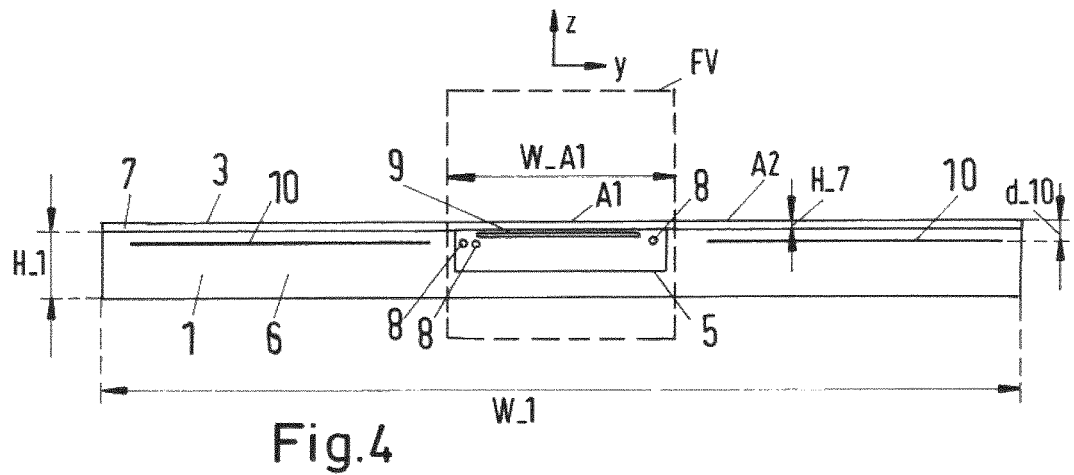

FIG. 4 shows a cross section of a pavement slab assembly 1 according to another embodiment of the invention.

The pavement slab assembly 1 shown in FIG. 4 is for the most part designed as the pavement slab assembly 1 shown in FIG. 3. In contrast to the pavement slab assembly 1 shown in FIG. 3, the piping elements 9 of the first heating system are integrated into the cable bearing element 5. It is shown that the piping elements 9 are arranged with a predetermined distance under or below a top surface of the cable bearing element 5 and predetermined distance above a bottom surface of the cable bearing element 5 with respect to the vertical direction z. However, the piping elements 9 are arranged above the electric lines 8 providing the primary winding structure 2 (see FIG. 1). In this case, the cable bearing element 5 can comprise recesses for receiving the piping elements 9. The top surface of the cable bearing element 5 is covered by the surface layer 7. In contrast to the embodiment shown in FIG. 3, a height H_7 of the surface layer 7 can be smaller than the height H_7 shown in FIG. 3, e.g. 0.035 m. Thus, the pavement slab assembly 1 can have a more compact design.

It is important that the piping elements 9 of the first heating system are arranged within the field volume FV. In particular, if projected onto the surface area 3 along the vertical direction z, the piping elements 9 are arranged within the first area A1.

The embodiment shown in FIG. 4 allows avoiding an increase of the height H_7 of the surface layer 7 due to the integration of piping elements 9. Another advantage is that heat generated by the primary winding structure 2 can be better recovered by the first heating system. In particular, heat generated by the primary winding structure 2 can be transferred to the operating fluid of the first heating system which, in turn, reduces a temperature drop of the operating fluid during operation. Thus, less energy is needed to reheat the operating fluid.

Figure 5:
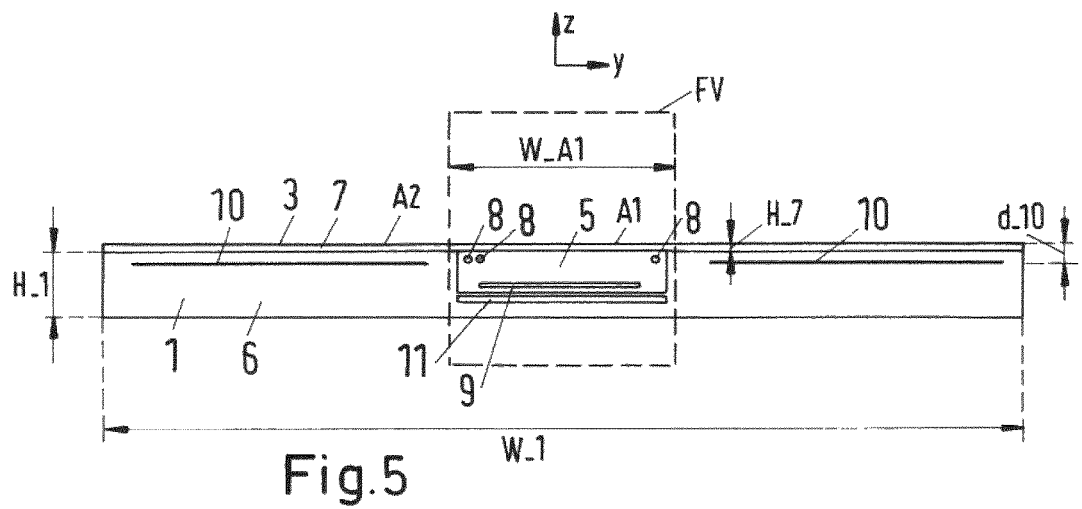

FIG. 5 shows a cross section of another embodiment of a pavement slab assembly 1. The pavement slab assembly 1 shown in FIG. 5 is mostly designed as the pavement slab assembly 1 shown in FIG. 4. In contrast to the pavement slab assembly 1 shown in FIG. 4, the piping elements 9 are arranged within a bottom portion of the cable bearing element 5. A bottom portion of the cable bearing element 5 can e.g. comprise a lower half or a lower third of the cable bearing element 5. This means that the piping elements 9 are arranged under the electric lines 8 providing the primary winding structure 2 (see FIG. 1). However, piping elements 9 are still arranged within the field volume FV. In particular, if projected onto the surface area 3, piping elements 9 are still arranged within the first area A1.

In this case, a distance from a top surface of the cable bearing element 5 to the piping elements 9 along the vertical direction z can be larger than a distance of the electric lines 8 to the top surface. Also, a distance of the piping elements 9 to a bottom surface of the cable bearing element 5 along the vertical direction z can be smaller than a distance of the electric lines 8 to the bottom surface. This distances, however, can depend on a design, e.g. a thickness or height, of the cable bearing element 5.

As seen in FIG. 4 and FIG. 5 the piping elements 9 can also be arranged at any other position under or above the primary winding structure 2.

Further shown is a thermal insulation element 11. The insulation element 11 is arranged under the piping element 9. It is shown that the insulation element 11 and the cable bearing element 5 are separate elements. This means that a distance of an upper surface of the insulation element 11 to the surface area 3 along the vertical direction z is larger than a distance of the bottom surface of the cable bearing element 5 to the surface area 3 along the vertical direction z.

As the embodiment shown in FIG. 4, the pavement slab assembly 1 shown in FIG. 5 advantageously allows avoiding an increase of the height H_7 of the surface layer 7.

However, the piping elements 9 may have to be designed such that a higher thermal power can be delivered by the piping elements 9. This can e.g. mean that a diameter of piping elements 9 may be larger than a diameter of the piping elements 9 shown in FIG. 4 or FIG. 3. However, an actual design of the cable bearing element 5, in particular of a top portion of the cable bearing element 5 which receives the electric lines 8 does not need to be modified. Only a bottom portion of the cable element 5 may have to be modified in order to receive the piping elements 9 of the first heating system.

Figure 6:
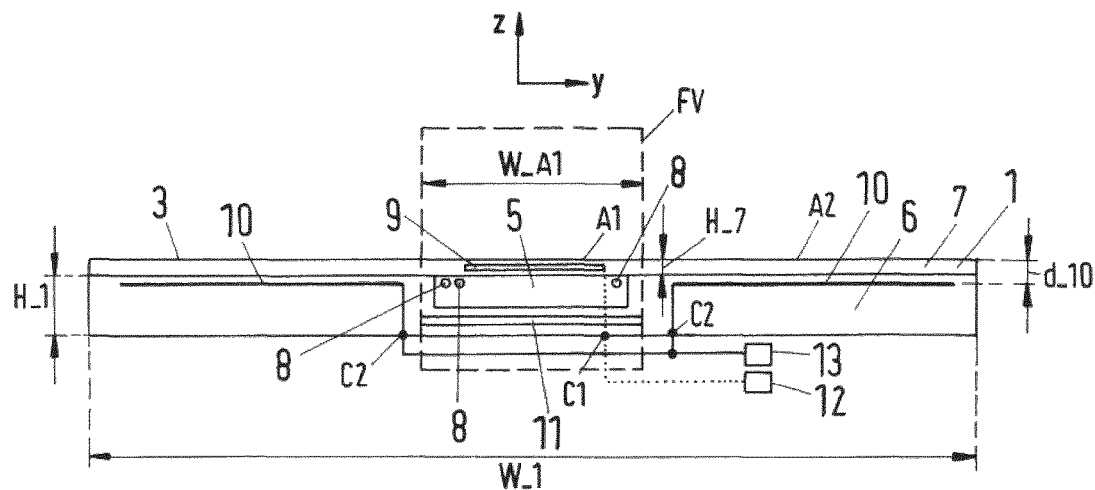

FIG. 6 shows a cross section of a pavement slab assembly 1 according to another embodiment of the invention. A cable bearing element 5 is integrated into a body 6 of the pavement slab assembly 1. Piping elements 9 of a first heating system are arranged above the cable bearing element 5. The piping elements 9 are integrated into a surface layer 7 of the pavement slab assembly 1. Further integrated into the body 6 of the pavement slab assembly 1 is an insulation element 11 which is arranged under the cable bearing element 5.

Further shown are connecting means C1 of the piping elements 9 of the first heating system to a remaining part 12 of the first heating system and connecting means C2 of the elements 10 of the second heating system to a remaining part 13 of the second heating system. The remaining part 12 of the first heating system can e.g. be a part of a fluid circuitry which comprises a pumping element, a heat pump and/or a heat source for heating an operating fluid running through the fluid circuitry. The connecting means C1 are arranged at a bottom surface of the pavement slab assembly 1. In this case, vertically extending fluid connection means are provided, which connect the piping elements 9 with the connecting means C1. The connecting means C1 can e.g. be designed as inlet/outlet.

The piping elements 9 are arranged in a plane which is oriented perpendicular to the vertical direction z. The vertical connection means extend along the vertical direction z.

In a similar manner, the elements 10 of the second heating system are arranged in a plane which is perpendicular to the vertical direction z. Vertically extending connecting means for connecting the elements 10 of the second heating system to their respective connecting means C2 also extend in the vertical direction. The second heating system can be designed as an electrical heating system or, as described previously, a hydronic heating system. Thus, the remaining part 13 of the second heating system can comprise a voltage supply means. Depending on the type of the second heating system, the connecting means C2 can be designed as electrical connector or inlet/outlet.

Figure 7:
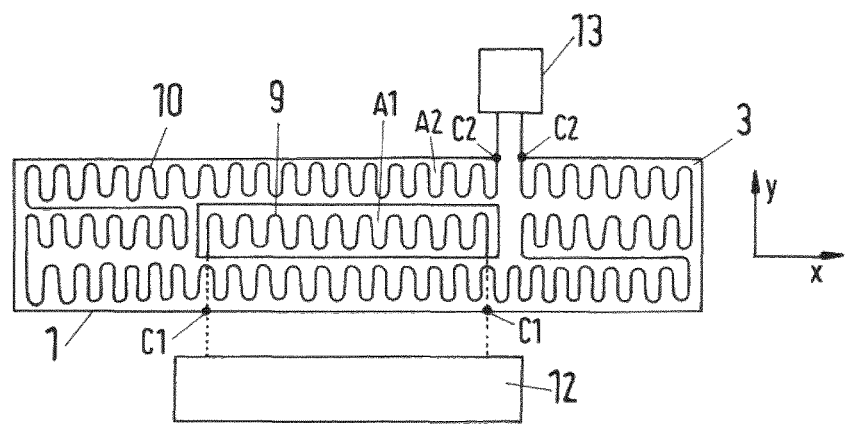

FIG. 7 shows a top view on the elements 10 and the piping elements 9 of the second and the first heating system. It is shown that the piping elements 9 extend within the field volume FV (see e.g. FIG. 3), e.g. within the first area A1, along the longitudinal direction x in a meandering manner (if projected onto the surface area 3 along the vertical direction z). The piping elements 9 provide a part of a closed fluid circuit of the first heating system. In FIG. 7, two connecting means C1 for the piping elements 9 to a remaining part 12 of the first heating system are shown.

Also shown are the elements 10 of the second heating system which are arranged outside the field volume FV (see e.g. FIG. 3). The elements 10 are arranged such that a second area A2 is covered by elements 10 if projected onto the surface area 3 along a vertical direction z (see FIG. 3). With respect to the longitudinal direction x and a lateral direction y, the elements 10 of the second heating system are arranged in rows, wherein the elements 10 in one row extend in a meandering manner along the longitudinal direction x. At the end of each row, a connecting element to the next row (with respect to the lateral direction y) can be provided.

Also, elements 10 can provide a portion of a closed fluid circuitry. Two connecting means C2 to a remaining part 13 of the second heating system are shown which allow an operating fluid to flow into and out of the elements 10 of the second heating system.

The invention claimed is:

1. A system for inductive power transfer to vehicles driving or standing on a surface of a route, comprising:
   a primary winding structure for generating an alternating electromagnetic field, wherein a field volume is assigned to the primary winding structure; and
   at least a part of a first heating system, wherein elements of the first heating system which are arranged within the field volume are non-metallic elements,
   wherein the system comprises at least a part of at least one other heating system, wherein all elements of the at least one other heating system are arranged outside the field volume.

2. The system according to claim 1, wherein the first heating system and/or the at least one other heating system comprises a hydronic heating system.

3. The system according to claim 2, wherein the elements of the first heating system and/or the elements of the at least one other heating system comprise at least one transporting means for an operating fluid.

4. The system according to claim 3, further comprising at least one connecting means for connecting the at least one transporting means to an external fluid supply.

5. The system according to claim 1, wherein the other heating system is an electric heating system.

6. The system according to claim 1, wherein at least a part of the first heating system is arranged under and/or over the primary winding structure.

7. The system according to claim 1, further comprising a cable bearing element, wherein at least a part of the first heating system is arranged under and/or over the cable bearing element.

8. The system according to claim 1, further comprising a cable bearing element, wherein at least a part of the first heating system is arranged within the cable bearing element.

9. The system according to claim 8, wherein the cable bearing element comprises receiving means for receiving at least a part of the first heating system.

10. The system according to claim 1, further comprising at least one thermal insulation element, wherein the at least one thermal insulation element is arranged under the part of the first heating system and/or the at least one other heating system.

11. The system according to claim 1, further comprising at least one temperature sensor for sensing a temperature of a reference surface and/or at least one snow sensor and/or at least one ambient temperature sensor.

12. A pavement slab assembly for a route for vehicles driving or standing on a surface of the route, comprising a system according to claim 1, wherein the pavement slab assembly consists at least partially of pavement material.

13. A method of operating a system according to claim 1, comprising activating the first heating system and/or the at least one other heating system.

14. The method according to claim 13, the method further comprising operating the first heating system and/or the at least one other heating system, depending on a temperature of a reference surface of the primary winding structure and/or an ambient air temperature and/or depending on a presence of a winter contaminant on the reference surface.

15. The method according to claim 13, further comprising operating the first heating system and/or the at least one other heating system in response to a winter contaminant being predicted.

16. The method according to claim 13, further comprising operating the first heating system and/or the at least one other heating system such that a temperature of at least a portion or point of a reference surface of the primary winding structure is higher than or equal to a predetermined temperature.

17. A method for building a system for inductive power transfer to vehicles driving or standing on a surface of a route, the method comprising:
    providing a primary winding structure, wherein a field volume is assigned to the primary winding structure;
    providing at least a part of a first heating system;
    arranging elements of the first heating system such that elements of the first heating system which are arranged within the field volume are non-metallic elements; and
    providing at least a part of at least one other heating system, wherein all elements of the at least one other heating system are arranged outside the field volume.

18. A method of building a pavement slab assembly, the method comprising:
    providing a casting mould;
    providing a primary winding structure, wherein a field volume is assigned to the primary winding structure;
    arranging the primary winding structure within the casting mould;
    casting pavement material into the casting mould;
    providing at least a part of a first heating system;
    arranging elements of the first heating system within the casting mould, wherein elements of the first heating system which are arranged within the field volume are non-metallic elements; and
    providing at least a part of at least one other heating system, wherein all elements of the at least one other heating system are arranged outside the field volume.

19. A method for building a route for vehicles driving or standing on a surface of the route, the method comprising:
    providing a plurality of pavement slab assemblies according to the method of claim 18; and
    installing the pavement slab assemblies on a prepared base or foundation such that a driving surface or standing surface for vehicles which are driving or standing on the route is provided.

* * * * *